Feb. 19, 1957  M. C. SELBY  2,782,377
MICROPOTENTIOMETERS
Filed June 29, 1951  3 Sheets-Sheet 1
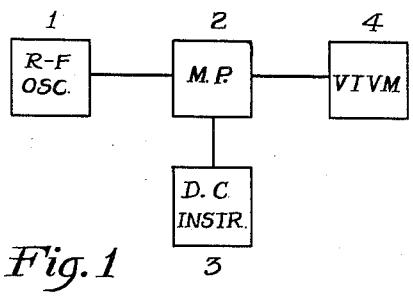
Fig. 1
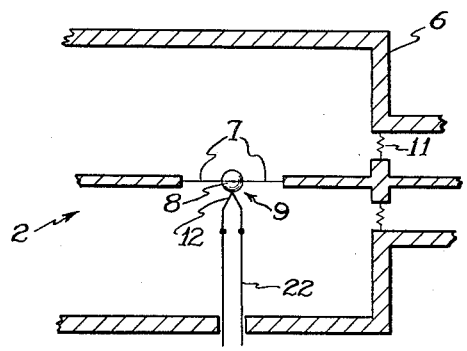
Fig. 2
Fig. 10
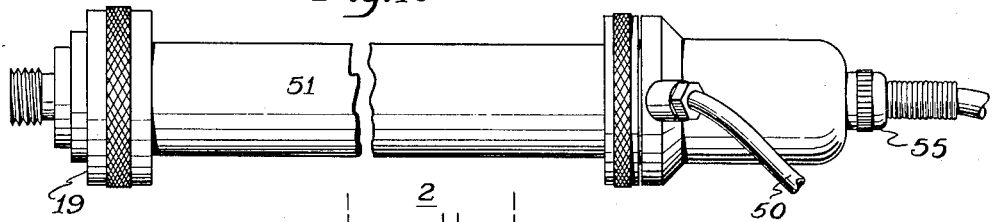
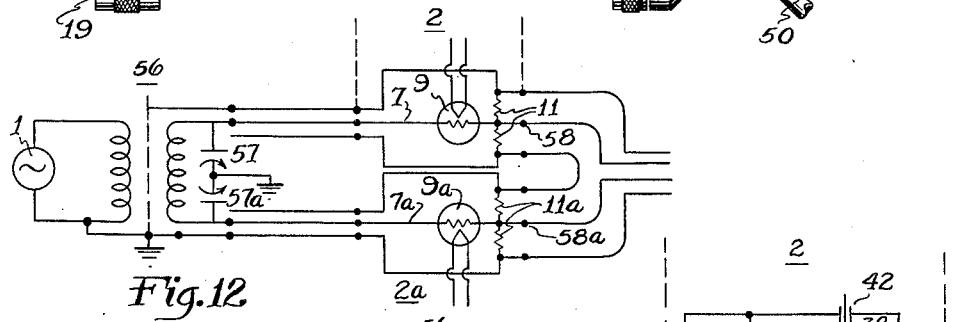
Fig. 12
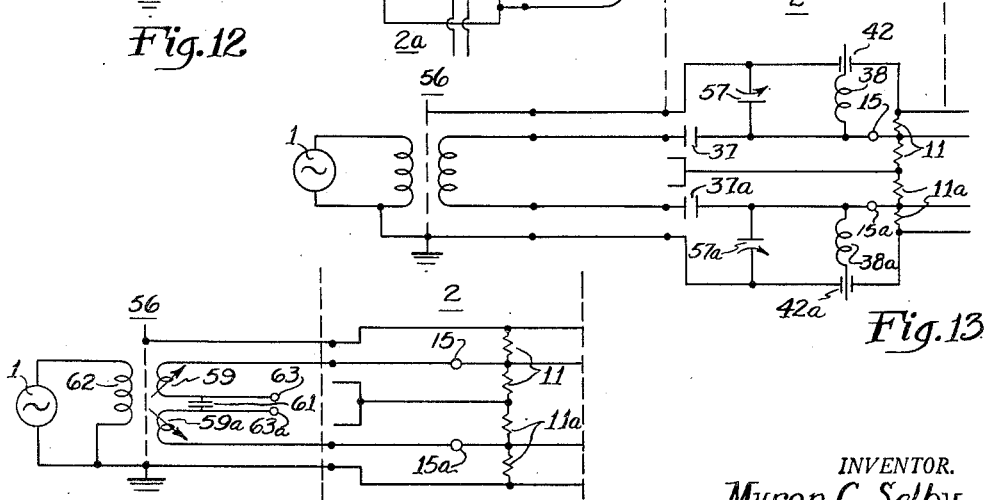
Fig. 13
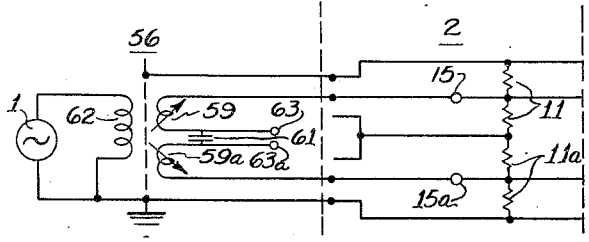
Fig. 14
INVENTOR.
Myron C. Selby
BY
Max L. Libman
ATTY.

Feb. 19, 1957 M. C. SELBY 2,782,377
MICROPOTENTIOMETERS
Filed June 29, 1951 3 Sheets-Sheet 2
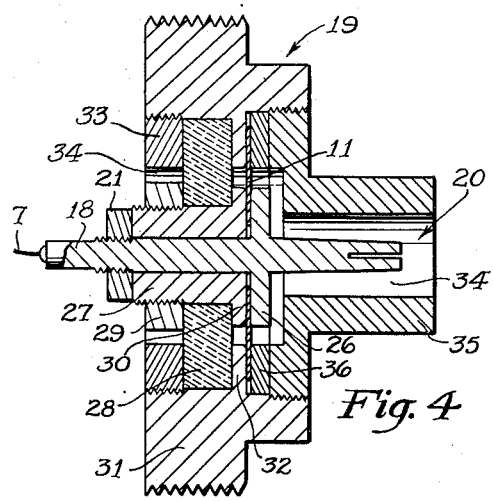
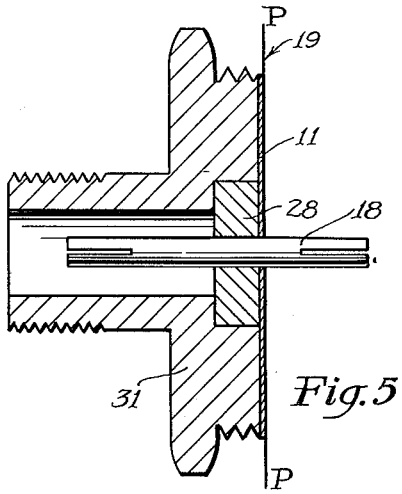
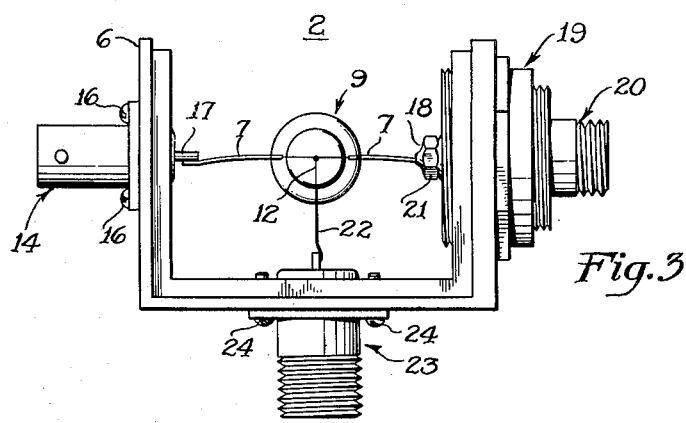
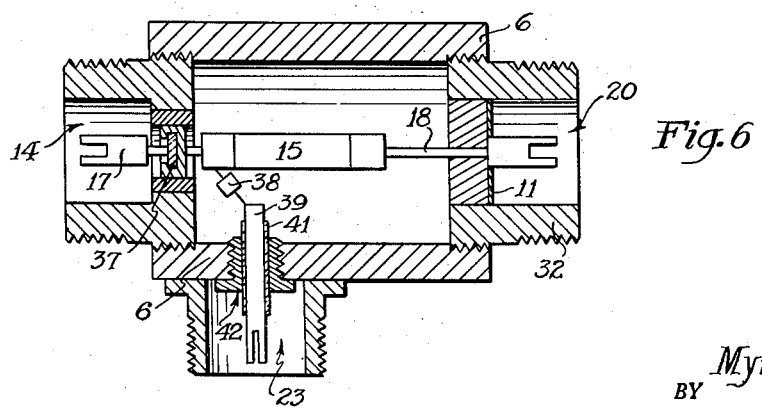
INVENTOR.
Myron C. Selby
BY
Max L. Libman
ATTY.

Feb. 19, 1957  M. C. SELBY  2,782,377
MICROPOTENTIOMETERS
Filed June 29, 1951  3 Sheets-Sheet 3
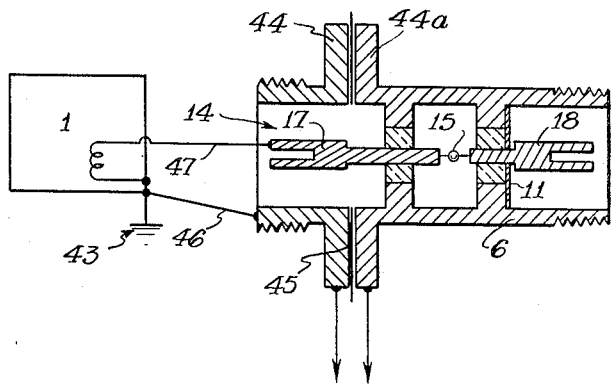
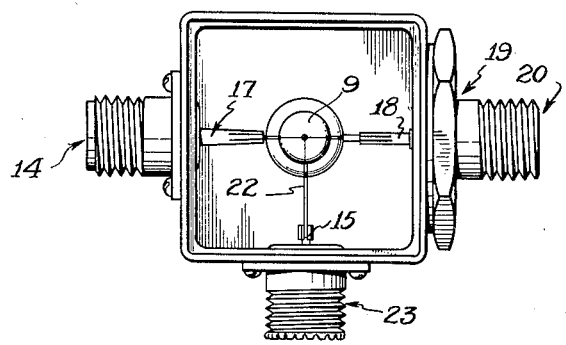
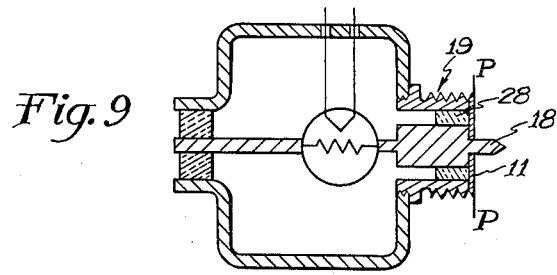
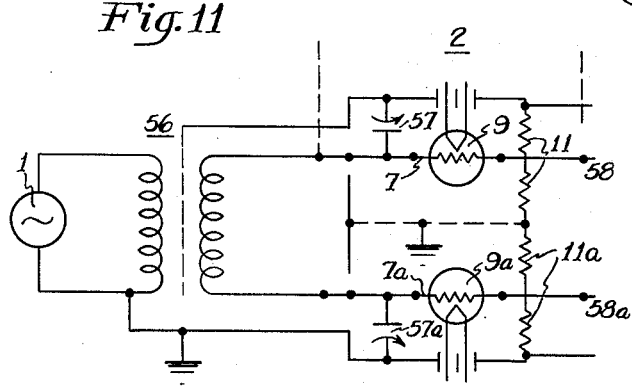
INVENTOR.
Myron C. Selby
BY
Max L. Libman
ATTY.

United States Patent Office 2,782,377
Patented Feb. 19, 1957

2,782,377

MICROPOTENTIOMETERS

Myron C. Selby, Washington, D. C., assignor to the United States of America as represented by the Secretary of Commerce Application June 29, 1951, Serial No. 234,166

14 Claims. (Cl. 333—26)

(Granted under Title 35, U. S. Code (1952), sec. 266)

The invention described herein may be manufactured and used by or for the Government of the United States for governmental purposes without the payment to me of any royalty thereon in accordance with the provisions of the Act of March 3, 1883, as amended (45 Stat. 467; 35 U. S. C. 45).

This invention relates to the development of a high-frequency low-voltage standard which will supply accurately known voltages from 1 to $10^6$ microvolts at all frequencies from zero to several thousand megacycles without the use of attenuators or voltmeters.

The present system for obtaining high-frequency, low-voltage standards consists of producing a high-frequency voltage of approximately one volt, attenuating this voltage and monitoring the output with a voltmeter. This system presents several serious disadvantages. One is that the output impedance of the generator varies greatly over wide frequency ranges. A second disadvantage is the necessity of using attenuators to drop the generated voltage from the order of magnitude of one volt to all desired lower values—in this case, a ratio of 1 million to one. The construction of these attenuators, maintenance of their stability with regard to time, use, temperature, and humidity, and their calibration entail expensive and difficult procedures. A third disadvantage is the uncertainty of the initial calibration and especially of long-time calibration stability. A fourth major disadvantage to this system is that none of the signal generators that are available at present will cover the entire frequency range under consideration. In fact four generators are usually required to cover this range and as a result four separate standards are required. Other disadvantages are the limitations of vacuum tube voltmeters due to frequency and harmonic errors, calibration instability, zero drift and poor accuracy at low scale indications. Still another reason for inaccuracy is the effect of load on the frequency of the generator.

As a result of these limitations, considerable difficulty has been encountered in establishing low-voltage, high-frequency standards.

It is therefore the primary object of this invention to provide a voltage standard for low voltages at high frequencies that will be free from the aforementioned difficulties.

Anothr object is to provide a high-frequency, low-voltage standard that will operate over a range of frequencies from 0 to several thousand megacycles and over a range of voltages from one to one million microvolts without frequency correction.

Another object is to provide a standard with a non-inductive output impedance.

Another object is to provide a standard with an output impedance of the order of milliohms.

Another object of the invention is to provide an inexpensive and uncomplicated high-frequency, low-voltage standard.

Another object is to provide a single unit for the entire frequency range of from zero to several thousand megacycles.

Another object is to provide a balanced voltage standard at high frequencies and low voltages.

Another object is to provide a voltage standard that is relatively insensitive to harmonic frequencies.

Another object is to provide a standard that is not sensitive to frequency.

Still another object is to provide a standard that is quickly and easily calibrated.

Still another object is to provide a high-frequency, low-voltage standard that is calibrated by the use of a direct current.

Another object is to provide a standard with a good long-time stability.

In accordance with the present invention there is provided a unit which will hereinafter be referred to as a micropotentiometer, which unit will when used in conjunction with a radio-frequency oscillator provide the standard output voltage required. The micropotentiometer is composed of two principal parts, a noninductive resistor and a current-measuring unit. The noninductive resistor acts as a load on the R. F. oscillator and the standard voltage is taken off across this resistor. This resistor is made of a very thin annular ring of conductive material and is connected between the center and outer conductors of a coaxial cable. Since such type of resistor is essentially noninductive, its resistance will remain constant over a very wide frequency range, and therefore the direct-current resistance can be taken as the resistance at high frequency without introducing an appreciable error. It should also be noted that since this resistor is made of highly conductive material its resistance will be very low. As a result, when the micropotentiometer is being used to calibrate an instrument whose input impedance is relatively high, the instrument will represent practically no increase in load and therefore the frequency of the R. F. oscillator will not vary significantly during the calibration of the instrument. The high-frequency current flowing through this resistor is measured by means of a current responsive unit connected in series with the center conductor of the coaxial cable. This unit also is not responsive to frequency changes over a very wide range. In one embodiment of the invention this unit is a heater and thermocouple. The load current is passed through the heater and the thermocouple is connected to a suitably calibrated D. C. indicating instrument. These current-measuring units are available commercially and are, or may readily be, calibrated.

The micropotentiometer therefore includes a resistor that does not vary with frequency and a means for measuring the load current which is also unaffected by frequency. Then by means of Ohm's law ($E=IR$) the value of voltage is easily calculated, or obviously, the instrument may be calibrated in terms of voltage.

It is apparent from the above that the only function of the R. F. oscillator is to provide a readily controllable current at known frequency. Indeed any audio-frequency or radio-frequency oscillator, or signal generator, may be used as a source. Since the load on the oscillator remains practically constant, frequency stability is readily obtainable. Also since the current is measured in the micropotentiometer the oscillator is only required to produce a controllable amplitude current. Expensive calibration of the oscillator is greatly reduced and attenuators and voltmeters are eliminated entirely. Variations in calibration over long periods is no longer a serious problem, since, even if the resistance of the annular ring does vary, which is highly unlikely, the resistance of the annular ring can be measured by the very rapid and uncomplicated D. C. voltmeter-ammeter method.

Other uses and advantages of the invention will become apparent upon reference to the specification and drawings.

Figure 1 is a block diagram showing the micropotentiometer being used to calibrate a vacuum-tube voltmeter.

Figure 2 is a circuit diagram showing the internal electrical connections of the micropotentiometer.

Figure 3 is a view in elevation of the physical structure of one embodiment of the present invention.

Figure 4 is a cross section of the annular ring assembly.

Figure 5 is a cross-sectional view of a modification of Figure 4 in which the annular ring is obtained by plating.

Figure 6 is a partial cross-sectional view of a further modification of Figure 3, using a plated annular ring and a different type of current-measuring device.

Figure 7 is a view in elevation of another modification using still another type of current-measuring unit.

Figure 8 is a view in elevation showing a modification which allows the resistance and thermocouple units to be quickly changed.

Figure 9 is a cross-sectional view of a modification in which the annular ring is located at a new position.

Figure 10 shows another modification of the micropotentiometer.

Figures 11–14 are circuit diagrams showing micropotentiometers being used to give a standard, balanced output.

Figure 1 is a block diagram showing a micropotentionmeter being used to calibrate a vacuum-tube voltmeter. The output of the signal generator or R. F. oscillator 1 is fed to the micropotentiometer 2. The current through the load is measured and indicated on a suitably calibrated D. C. instrument 3. The input to vacuum tube voltmeter 4 is connected across the output of the unit 2, which output is the standard voltage desired. The operation is as follows: The signal generator 1 provides a current which is adjustable both as to frequency and amplitude for the micropotentiometer 2. The adjustable current is obtained by varying the current output of the oscillator of the signal generator. Most standard signal generators have an adjustment of this type and therefore there is no need for the use of attenuators. This immediately eliminates the many problems incident to the use of attenuators, some of which were pointed out in the introduction. Also, since the current is the only electrical quantity of importance there is no need for the use of a voltmeter to monitor the output of the generator. This fact will also eliminate many complications which are caused by the use of a voltmeter.

The adjustable current is fed into the micropotentiometer where it is measured by a means to be described later, and its value is indicated by the instrument 3.

The resistance of the micropotentiometer, which is constant for any single resistive unit, may be of any desired value from 100 microhms to 1 milliohm or higher if necessary, depending upon the value of voltage desired. This resistance is accurately measured before the start of the standardizing procedure by the voltmeter-ammeter method generally used for measuring very low resistances. This method requires the use of accurate D. C. ammeters and voltmeters which, however, are relatively inexpensive since the currents and voltages used are relatively large. The voltage output can then be easily calculated by the formula $E=IR$, since both the current and resistance are known. For example, if it is desired to obtain a voltage of one microvolt, it would be best to use a resistive element of 1 milliohm. Then a current of 1 ma. is needed to get the desired result. The signal-generator current control is varied until the ammeter reads 1 ma. and then it is known that the output is 1 microvolt.

This example demonstrates the extreme ease with which it is possible to obtain standard voltages by means of the present invention.

Figure 2 is a circuit diagram showing the internal electrical connections of the micropotentiometer 2. The outer casing 6 of the unit 2 forms one conductor of the electrical circuit, while the wire 7 forms the other conductor. The heater 8 of the thermocouple unit 9 is inserted in the wire 7.

The resistive element 11 which is formed of an annular ring of highly conductive material is connected between the outer conductor 6 and the inner conductor 7. The calibrated voltage is developed across the annular ring 11 and appears as the output which is taken between the conductors 6 and 7.

The operation of the thermocouple unit is well known in the art and will be described only briefly.

The temperature of the heater as measured by the thermocouple 12 varies in a known manner with variations in current through the wire 7. Therefore the voltage developed by the thermocouple 12 is a D. C. quantity that is proportional to the alternating current regardless of the frequency of the alternating current. This D. C. voltage is fed to a suitably calibrated instrument 3 whose dial is marked in amperes or volts. The current in the wire 7 is read directly on this instrument.

Figure 3 shows the mechanical structure of one embodiment of the micropotentiometer 2. The front panel is shown partially cut away.

The input to the micropotentiometer is through the coaxial connector 14 which is bolted to the outer frame 6 of the unit 2 by means of bolts 16. The wire 7 is soldered to the center conductor 17 of the coaxial connector 14 at the input end and to the center post 18 at the output end. The center post 18 is a part of the assembly 19 which contains the annular ring and also contains the output connector 20. This assembly screws into the outer casing 6 and is described in detail with regard to Figure 4. The unit 21 is also described in the description of Figure 4.

The wire 7 in which the thermocouple unit 9 is inserted is actually a part of that unit. This unit has the shape of the standard acorn type tube, and the wires 7 are the lead-in wires. The wires 22 which are also part of the unit 9 connect the thermocouple 12 to a two-pronged female connector 23 which is bolted to the casing 6 by means of bolts 24.

The entire micropotentiometer unit just described is only 3 inches long, 2 inches high, and 2 inches deep. Other sizes and shapes have been used, some of which will be referred to later in the specification.

Figure 4 is a cross-sectional view of the assembly 19. The center post 18 is soldered to the wire 7 at one end and forms a part of the coaxial output connector 20 at the other end. The conductive annular ring 11 is slid down over the center post 18 and rests against the flange 26 of this post. The annular ring is held fast against this flange by means of the hollow cylinder 27 which fits snugly around the post 18 and is held tightly against the ring 11 by means of the nut 21. A circular disc 28, which is composed of a suitable insulating material, fits around the cylinder 27 and seats against the shoulder 30 of the cylinder. A nut 29, which screws onto the cylinder, holds the insulating disc firmly in place. This sub-assembly containing the parts 18, 11, 27, 21, 28, and 29 is now fitted into the outer hollow cylinder 31. The outer portion of the insulating disc 28 seats against the flange 32 of the cylinder 31 and is held tightly against this flange by the nut 33. It will be noted that the only mechanical connection between the inner and outer portions of the unit (except for the annular ring) is by means of the disc 28. This disc provides for a strong mechanical connection but one that is electrically nonconductive. Except for this disc and the annular ring the inner and outer portions of the assembly are separated by the air space 34.

The outer part 35 of the coaxial output connector 20 is screwed down into the cylinder 31. To prevent this part from coming into contact with the very thin annular ring 11 and possibly tearing it because of the twisting motion of 32 while it is being screwed into place, the washer 36 is placed between the disc and the part 32. A lead washer (not shown) may be placed between 11 and 36 to insure a better electrical contact if desired. This unit is now complete and can be screwed into the outer casing 6 of the micropotentiometer 2 by means of the screw threads on the outer surface of the cylinder 31.

In the completed unit 19 the annular ring 11 provides the only electrical path between the inner conductor or center post 18 and the outer conductor or cylinder 31. As shown in Figs. 4–7, the resistor element 11 comprises a thin planar annulus. In practice this annular ring may be made in several ways and from a number of different materials depending upon the desired resistance. These annular rings can be made of foils of platinum, tin, silver, gold or any other conductive material, having thicknesses of the order of 0.0003 to 0.001 inch, and having resistances ranging from 100 microhms to several milliohms. Also carbon elements have been made with resistances of about 1 ohm, and if required even higher resistances can be used. Actually the resistance of the ring depends upon several facts; such as, the resistivity of the material, the thickness of the ring, and the ratio of the inner and outer diameters of the ring. The main feature of these annular rings is that they are made of conductive elements and therefore must be kept exceedingly thin to get the desired resistances. This feature is very important because the annular rings must be kept as thin as possible so that the current will penetrate the entire thickness of these rings at all desired frequencies. The higher the frequency the thinner must be the element. The allowable thickness of the rings is inversely proportional to the square root of the frequency. It was anticipated and found to be true during the development of this invention, that if the above conditions were met the inductance of the rings would be extremely small and even at the very high frequencies the reactance drop may be ignored without introducing an appreciable error.

Figure 5 shows a modification of the assembly 19 in which the annular ring is made by plating rather than by forming circular discs out of the appropriate conductive foil. The cylindrical insulator 28 provides the mechanical connection between center post 18 and the outer conductor of cylinder 31. The insulator may be made of steatite or glass. If either is used, the following process for joining the insulator and metal may be used. Silver paint is fired onto the inner and outer cylindrical surfaces of the insulator 28. The silver is copper flashed so as to protect the silver. The copper surfaces are then tinned. Also the surfaces of the post 18 and conductor 31 that will contact the insulator are tinned. Then the post and conductor are soldered to the insulator. So far only the mechanical connections between 18, 28, and 31 have been made and nothing has been done toward the plating of the annular ring.

The plating process for the annular ring may be as follows: The surface of conductor 31 lying in the plane of the annular ring and a small portion of the center post lying to the right of the insulator are silver plated. Then a very thin film of silver is evaporated over the entire surface formed by the conductor 31 and insulator 28 in a plane perpendicular to the page. Then another and final silver finish is plated over this entire surface. This silver finish provides the annular ring.

There are other methods of forming the assembly 19 and the annular ring 11. If the post 18 and conductor 31 are made of Kovar metal they can be sealed in glass and therefore the insulator 28 would be glass. Then to form ring 11, fine silver can be deposited right on top of the glass. Also it is well known that metals can be soldered to ceramics and so the unit 19 might be made that way. Insulating cements might also be used.

Many other similar techniques are known or are being developed, but since this forms no part of the present invention they will not be discussed.

Figure 6 is a modification of the micropotentiometer shown in Figure 3. In this modification the annular ring is shown as plated, but it is to be understood that a ring made of foil or a plated ring may be used interchangeably, depending upon the characteristics desired.

In this embodiment the input is to the coaxial connector 14. The center conductor 17 of the coaxial connector is connected to a button condenser 37 which in turn is soldered to the current-measuring element 15. Element 15 is in turn connected to the center post 18. Annular ring 11 connects the center post 18 with the outer conductor 32 of the coaxial output connector 20.

The left side of the element 15 is also connected to a radio-frequency choke 38, which in turn is connected to the center conductor 39 of a special connector 23. This center conductor is surrounded by a dielectric material 41 to form a condenser 42 composed of condenser plates 6 and 39 and dielectric 41.

The operation of this unit is the same as the device of Figure 3 except for special modifications made so that different current-measuring units might be used. The current-measuring element 9 contains a special resistor with a positive temperature coefficient of resistance. This particular type of resistor is highly sensitive to temperature changes and as a result very small changes in current will produce measurable changes in resistance. Therefore in this embodiment of the current-measuring procedure consists of measuring the change of resistance of the unit 15. For this purpose a D. C. potentiometer is connected across the terminals 23 and 39. Current flows through 39, R. F. choke 38, element 15, center post 18, annular ring 11, and outer casing 6. This direct current is kept to a very small fraction of the load current (as low as 1000-to-1 for very accurate calibrations) and therefore the D. C. voltage drop across 11 can be disregarded. Also the resistance of element 15 is about 50 ohms and therefore the resistance of the annular ring 11 can be disregarded in the measurements of the resistance of 15.

Since this direct current will be applied to the micropotentiometer at all times during a calibration procedure, it is necessary that the R. F. current be kept from reaching the D.-C. output connector 23. To accomplish this the R. F. choke 38 and R. F. by-pass condenser 42 have been employed.

The button condenser 37 offers negligible impedance to the R. F. current but blocks the direct current and prevents a short circuit across the D.-C. input.

In Figure 7 the micropotentiometer has been modified so that the direct-current measuring circuit is connected to the grounded side of the radio frequency rather than the high side as in Figure 6. In this figure the R. F. oscillator 1 has one side of the source grounded at 43. The other side of the source is fed to the center conductor 17 of the input connector 14. A current-measuring element 15 is connected between the center conductors 17 and 18 of the input and output connectors respectively. The annular ring 11 forms a conductive path between the conductor 18 and the outer casing 6. In this modification the outer casing 6 is cut in two in a plane perpendicular to the page. A dielectric material is placed between these two sections, and the three parts are suitably fastened. This construction provides a condenser 45 formed in the outer casing 6. In practice flanges 44 and 44a are made as part of the outer casing 6. This obviously provides for a stronger assembly.

In this embodiment a thermistor is used as the current-responsive element. The thermistor operates on the same principle as the corresponding element in Figure 6 except that this unit has a negative temperature coefficient, while the element of Figure 6 has a positive temperature coefficient. The measuring technique therefore is the same in both cases. The use of the thermistor offers one great advantage over the other types of current-measuring elements already mentioned. As already stated, the voltage across the annular ring is equal to the current measured by the current-measuring element times the resistance of the annular ring. For this relationship to hold true the current in the measuring element and the annular ring must be equal. Since standing waves will be produced in the line between the generator and the annular ring, no effort having been made to terminate the line in its characteristic impedance, the current-measuring element must be physically small compared to the wave length at that frequency and must be located as close as possible to the ring to insure that the current through the measuring element is equal to the current through the annular ring. In this modification the direct current is applied across the flanges 44 and 44a. The current path is from the flange 44 through conductor 46 to the R. F. oscillator 1 through the oscillator and over wire 47 to the terminal 17, then through thermistor 15, center post 18, annular ring 11, the right side of the casing 6, and the flange 44a. The condenser 45 provides a very low impedance path for the radio frequency but blocks the direct current and thereby prevents a short circuit across the D.-C. source.

The advantage of this design over that of Figure 6 is that this unit eliminates the need for the condenser 37 and R. F. choke 38, and the D.-C. input is connected to a grounded R. F. terminal. It is assumed here that the D.-C. output resistance of the oscillator is negligible compared with the thermistor resistance as is usually the case. If this resistance is not negligible, the current-indicating element 9 may be calibrated on direct current with the oscillator in the circuit.

Figure 8 is a modified form of Figure 3 in which provision is made for readily changing both the current-measuring unit 9 and the annular ring assembly 19. When covering the entire range of voltages from one microvolt to one volt, it is necessary to change both the current-measuring unit 9 and the resistive element on the annular ring. Actually it will take 2 to 3 current-measuring units and 3 to 4 resistive elements to cover this range. To provide for this the wires 7 and 22 are made in the form of pins, and the inner portions of center conductors 17 and 18 of coaxial connectors 14 and 20 are made in the form of slotted pin receptacles. Also the terminals 15 of the connector 23 are modified so as to allow wires 22 to be plugged into the connector 23.

In use the wires 22 are plugged into the terminals 15. These wires are flexible so that once they are plugged in it is possible to move the unit 9 so that the wire 7 can then be plugged into the conductor 17. Then the assembly 19 is screwed into the frame 6 and the wire 7 is lined up with the conductor 18 so that as the unit 19 advances toward the left the wire 7 slides into the conductor 18 thereby completing the circuit.

This arrangement allows for the quick and easy interchanging of the thermo unit 9. As for changing the resistive unit, it is possible to have several assemblies 19, each with a desired resistance, or if only one unit 19 is available the annular disc 26 may be changed as explained with regard to Figure 4. Of course, if the plated type of resistive element is used, it will be necessary to have a separate unit 19 for each resistance desired.

In Figures 3 and 8 the thermocouple is shown as a single wire because the couple lies in a plane perpendicular to the plane of the page. This construction is necessary so that the loop formed by the thermocouple will be in the same plane as the magnetic field set up by the load current in wire 7. In this way no currents will be induced in the thermocouple by this field.

In Figure 9 there is shown a modification of Figure 4 which operates exactly the same at lower frequencies as the unit in Figure 4, but which corrects for certain undesirable effects at the higher frequencies.

As previously stated, one of the major objectives of this invention is to provide a source of standard voltage that has a negligible internal impedance. This becomes increasingly difficult with the unit shown in Figure 4 as the frequency increases because the inductance of the output connector 20 begins to have noticeable effect at these higher frequencies. In Figure 4 it will be noted that the annular ring 11 is not in the output plane P of the micropotentiometer. In practice this ring lies about one centimeter to the left of the output plane. Therefore at higher frequencies the impedance of this connector 19 (10 ohms at 1000 megacycles) causes a noticeable difference between the voltage at the output plane P and the voltage at the ring. This difference, of course, will depend to a great extent on the input impedance of the unit being calibrated.

To obviate this difficulty micropotentiometers have been developed in which the annular ring lies in the output plane. Such an arrangement is shown in Figure 9. The output connector 19 is modified so that one surface of the insulating support 28 for the center post 18 is located in the output plane. The annular ring 11 is plated over the insulating support 28 and over the entire surface of the output connector in the output plane P.

This embodiment of the invention can be used over the entire range of from zero to several thousand megacycles without encountering any serious frequency effects.

In Figure 10 there is shown a further modification of the micropotentiometer in which the unit is composed of a known length of coaxial transmission line 51 terminated in an annular ring assembly 19 of one of the types shown in Figures 4, 5, and 9. The R. F. input cable is shown at 50, while a vacuum tube voltmeter probe is shown at 55.

In one form of this modification the coaxial line is equal to an odd number of quarter wave lengths of the frequency of the input. For a line with negligible losses (this is usually true in practice) the output voltage across the annular ring is equal to the input voltage times the ratio of the annular resistance to the characteristic impedance of the line. The equation for this relation is $$V_2 = V_1 \frac{R}{Z_0} \text{ volts} \quad (1)$$

where:

$V_1$ is the input voltage,
$V_2$ is the output voltage,
$R$ is the resistance of the annular ring in ohms, and
$Z_0$ is the characteristic impedance of the line in ohms.

As indicated by Equation 1, it is necessary to know the input voltage in this form of micropotentiometer. However, in this instance this does not present a difficult problem, since the input voltage is of the order of magnitude of a volt. The characteristic impedance of a standard coaxial line may be 50 ohms. When used with an annular resistance of 100 microhms the term $R/Z_0$ has a value of $2 \times 10^{-6}$. Therefore to obtain a voltage as low as 2 microvolts, an input voltage of 1 volt is used. Vacuum tube voltmeters that will measure one volt even at very high frequencies are readily available.

It must be remembered, however, that Equation 1 holds true only when the length of the coaxial line is equal to an odd number of quarter wave lengths of the impressed frequency. However, the output voltages at intermediate frequencies may be computed from the equation:

$$V_2 = V_1 \frac{R}{Z_0} \sin Kf \text{ volts} \quad (2)$$

where:

$V_1$ is the input voltage
$V_2$ is the output voltage
$R$ is the resistance of the annular ring in ohms
$Z_0$ is the characteristic impedance of the line in ohms
$K$ is a constant equal to $2.09 \times 10^{-10}$ $l$, $l$ being equal to the length of the line in meters for an air dielectric line.

In case the line has a solid dielectric having a dielectric constant of $\epsilon$ relative to air, the value of $l$ has to be multiplied by the square root of $\epsilon$.

$f$ is the applied frequency in cycles per second.

Again the ratio of R to $Z_0$ is so small that the input voltage can be relatively large.

Figure 11 shows a micropotentiometer adapted to provide a balanced output. Balanced voltages are required in particular to standardize push-pull outputs. At present there are few balanced voltage standards available and even these are not very reliable. However, the present system described below provides the required accuracy in a very simple system.

The R. F. oscillator 1 feeds the balanced micropotentiometer 2 through transformer 56. The micropotentiometer is located between the dotted lines. The current in each wire is measured by separate theremocouple units 9 and 9A. Also there are two annular rings 11 and 11a. The input wires 7 and 7a are connected to ground through condensers 57 and 57a. The output is taken across 58 and 58a.

For the voltage to be perfectly balanced, the current through each annular ring must be such that the drop across each ring is equal. The condensers 57 and 57a are provided for this purpose. By varying either condenser, say 57, the current flow through the ring 11 may be varied. If the voltage drop across 11 and 11a is the same, then the conductors 58 and 58a have equal potentials with respect to ground and the balanced output is taken across 58 and 58a. The micropotentiometer in this case is made as a double unit having two inputs, two thermoelements and two annular rings. Of course, there is only one output.

Figure 12 is a wiring diagram showing how a balanced output can be obtained by using two single-ended micropotentiometers. It will be noted that in this case the condensers 57 and 57a are located outside of the units 22a. Also the two outer casings must be electrically connected. Aside from these two minor differences this arrangement is identical with that shown in Figure 11.

Figure 13 shows a micropotentiometer for providing a balanced output in which thermistors 15 and 15a are used to measure the load current. In this arrangement as in the arrangement of Figure 6, it is necessary to provide a filter for the R.-F. currents, composed of R.-F. chokes 38 and 38a and condensers 42 and 42a. Also, as in Figure 6, the button condensers 37 and 37a prevent a short circuit from occurring across the D.-C. terminals, but they offer only negligible resistance to the flow of the R.-F. currents. In this figure, as in Figure 11, condensers 57 and 57a are provided to allow the load currents to be varied.

Figure 14 shows a further modification of a micropotentiometer for providing a balanced output. In this modification the transformer 56 has two secondary windings 59 and 59a. These two secondaries are coupled together by the condenser 61. Both secondaries are adjustable with respect to the primary 62, and in this way the current in each circuit can be varied. Therefore in this modification the variable secondaries 59 and 59a serve the same purpose as the condensers 57 and 57a in Figures 11–13.

This modification also has a different current-measuring circuit. In the circuit of Figure 13 the D.-C input was to the high side of the R. F. circuit, as was the case in Figure 6. The present arrangement, however, provides a means for connecting the D.-C. input to a point of low R.-F. potential.

The condenser 61 offers negligible resistance to R. F. current but acts as an open circuit with respect to direct current. Therefore the D.-C. path is from terminal 63 through secondary 59. Thermistor 15, annular ring 11, annular ring 11a, secondary 59a, and to terminal 63a. Here the value of both thermistors is measured, but since the current measurements are based on the change of resistance per unit of resistance or $\Delta R/R$ the current can still be read directly.

It will be apparent that the embodiments shown are only exemplary and that various modifications can be made within the scope of my invention as defined in the appended claims.

I claim:

1. An adjustable-amplitude constant-voltage source for producing balanced voltages in a range from 1 to $10^6$ microvolts over a range of frequencies from zero to several thousand megacycles per second, comprising a transformer having a primary winding connected across an electrical transmission line to receive an adjustable-amplitude, adjustable-frequency current, said transformer having at least one secondary winding with two terminals, a micropotentiometer in the form of a pair of waveguides, each having coaxial center and outer input terminals coaxially arranged with respect to said waveguide, each of said center input terminals being connected respectively to a different one of said secondary winding terminals, and separate coaxially arranged center and outer output terminals corresponding respectively to each of said input terminals, said micropotentiometer comprising two substantially noninductive annular rings, each electrically joining and coaxial with respective center and outer output terminals of one of said waveguides, said rings having inner and outer circumferences defining a thin, planar annulus of conductive material having a finite resistance, the magnitude of which is negligible compared to the load impedance, and the thickness of said ring being such as to permit complete current penetration through the thickness of said annulus, each of said annular rings having an impedance which is substantially lower than the characteristic impedance of said transmission line, and two current-responsive elements, each of said current-responsive elements being connected between corresponding center input and output terminals respectively, the physical extent of each of said current-responsive elements and associated ring as measured in a direction extending between the input and output terminals of said waveguides being negligibly small as compared to a wavelength of the highest frequency source-current, the outer circumferences of said annular rings being connected together.

2. The invention according to claim 1 in which the annular rings are located in the plane of the output terminals of said constant-voltage source.

3. An adjustable-amplitude constant-voltage source for producing known, accurately controllable balanced and unbalanced voltages in a range from 1 to $10^6$ microvolts over a frequency from zero to several thousand megacycles per second comprising a micropotentiometer in the form of a waveguide having coaxial center and outer input terminals adapted to be connected to a source of adjustable-amplitude, adjustable-frequency current, and coaxially arranged center and outer output terminals corresponding respectively to said input terminals for connection to a load, a resistor electrically joining and coaxial with the center and outer output terminals of said waveguide, said resistor comprising a thin, planar annulus of conductive material having a finite resistance, the magnitude of which is of an order which is negligible compared to the impedance of the load, and the thickness of said annulus being such as to permit complete current penetration through the thickness of said annulus throughout said frequency range, and current-responsive means electrically connecting corresponding center input and output terminals, the physical extent of said current-responsive means and said resistor as measured in a direction extending between the input and output terminals of said waveguide being negligibly small as compared to the wavelength of the highest frequency source-current.

4. The invention as recited in claim 3 in which said resistor has a resistance in the range of between 100 microhms and several ohms.

5. The invention as recited in claim 4 in which the said micropotentiometer comprises a coaxial member comprising a center and outer conductor, said output terminals comprising the center and outer conductors respectively of said coaxial member, an insulating disc mechanically joining the center and outer conductors and said resistor being formed by plating an electrically conductive coating on a face of said disc between and electrically joining said center and outer conductors.

6. The invention as recited in claim 5 in which the said resistor lies in the plane of the output terminals of the said constant-voltage source.

7. The invention as recited in claim 3 in which the said current-responsive means consists of a heater element connected in series with one of said input terminal means and said resistor, a thermocouple element responsive to temperature changes in said heater element and a meter for measuring the voltage produced by said thermocouple, said voltage being a function of the temperature of said heater element.

8. The invention as recited in claim 3 in which the said current-responsive means consists of a second resistor having a negative temperature coefficient of resistance, said second resistor varying in resistance as a function of the current through said second resistor, resistance-measuring means for determining the value of said resistance, said resistance-measuring means being calibrated to indicate the current in said second resistor.

9. The invention as recited in claim 8 in which the resistor lies in the plane of the output terminal of said constant-voltage source.

10. The combination according to claim 3 wherein said current-responsive means comprises a second resistor, the resistance of which varies as a function of the current flowing therethrough, and resistance measuring means for determining the value of said resistance.

11. The combination according to claim 10 wherein said second resistor has a positive temperature coefficient of resistance.

12. An adjustable-amplitude constant-voltage source for producing accurately controllable balanced voltages over a wide frequency range comprising: a transformer primary for connecting said constant-voltage source to a source of adjustable-amplitude, adjustable-frequency current, a transformer secondary having at least two terminals, a micropotentiometer in the form of a pair of waveguides, each having coaxial center and outer input terminals coaxially arranged with respect to said waveguide, each of said center input terminals being connected respectively to a different one of said transformer secondary terminals and separate coaxially arranged center and outer output terminals corresponding respectively to each of said input terminals, said micropotentiometer comprising at least two resistors each electrically joining and coaxial with respective center and outer output terminals of one of said waveguides, each of said resistors comprising a thin, planar annulus of conductive material having a finite resistance, the magnitude of which is of an order which is negligible compared to the impedance of the load, and the thickness of said annulus being such as to permit complete current penetration through the thickness of said annulus throughout said frequency range, and current-responsive means electrically connecting each of said center input terminals to a corresponding center output terminal, respectively, the physical extent of each of said current-responsive devices and associated resistor as measured in a direction extending between the input and output terminals of said waveguide being negligibly small as compared to a wavelength of the highest frequency source-current.

13. An adjustable-amplitude constant-voltage source for producing known, accurately controllable balanced and unbalanced voltages in a range from 1 to $10^6$ microvolts over a frequency of from zero to several thousand megacycles per second comprising a waveguide having coaxial center and outer input terminals adapted to be connected to a source of adjustable-amplitude adjustable-frequency current, and coaxially arranged center and outer output terminals corresponding respectively to said input terminals for connection to a load, a resistor electrically joining and coaxial with the center and outer output terminals of said waveguide, said resistor comprising a thin, planar annulus of conductive material having a finite resistance, the magnitude of which is of an order which is negligible compared to the impedance of the load, the impedance of said annulus being substantially less than the characteristic impedance of said waveguide and the thickness of said annulus being such as to permit complete current penetration through the thickness of said annulus throughout said frequency range, and electrical means responsive to an electrical quantity applied to said annulus connecting corresponding center input and output terminals for determining the voltage thereacross, the physical extent of said electrical means and said resistor as measured in a direction extending between the input and output terminals of said transmission line being negligibly small as compared to a wavelength of the highest frequency source-current.

14. The combination according to claim 13 wherein said waveguide is a coaxial line and said annulus extends between and electrically connects the center and outer conductors of said coaxial line.

References Cited in the file of this patent
UNITED STATES PATENTS

| | | |
|---|---|---|
| 2,262,020 | Llewellyn | Nov. 11, 1941 |
| 2,460,476 | Tyzzer | Feb. 1, 1949 |
| 2,497,094 | Moreno | Feb. 14, 1950 |
| 2,557,122 | Leiphart | June 19, 1951 |
| 2,565,900 | Wiley | Aug. 28, 1951 |
| 2,590,477 | Weber et al. | Mar. 25, 1952 |
| 2,642,472 | McCouch | June 16, 1953 |
| 2,677,808 | Hall | May 4, 1954 |

OTHER REFERENCES

Montgomery: Technique of Microwave Measurement, published by McGraw-Hill, N. Y., in 1947, pages 187–191. (Copy in Div. 69.)

Publication I: "Electronics," November 1949, pages 193, 195 and 197. (In Div. 69, Class 171–95–CA.)

Publication II: "Technique of Microwave Measurements," by Carol G. Montgomery, pages 130–146, Radiation Laboratory Series No. 11. Published in 1947 by McGraw-Hill, N. Y. (Copy in Div. 69.)